United States Patent [19]

Rigal

[11] 4,261,668
[45] Apr. 14, 1981

[54] SPLIT RING RETENTION OF SPLINED OR TOOTHED PARTS

[75] Inventor: Michel F. Rigal, Chaville, France

[73] Assignees: Societe Anonyme Automobiles Citroen; Automobiles Peugeot, both of Paris, France

[21] Appl. No.: 38,740

[22] Filed: May 14, 1979

[30] Foreign Application Priority Data

Jun. 2, 1978 [FR] France .............................. 78 16518

[51] Int. Cl.³ .............................................. F16D 1/06
[52] U.S. Cl. .................................. 403/319; 403/326; 403/359
[58] Field of Search ............... 403/359, 326, 404, 315, 403/319; 85/8.8

[56] References Cited

U.S. PATENT DOCUMENTS

| | | | |
|---|---|---|---|
| 2,844,013 | 7/1958 | Spence | 403/359 X |
| 3,832,076 | 8/1974 | Gehrke | 403/359 |
| 3,992,117 | 11/1976 | Ristau | 403/359 X |
| 4,077,232 | 3/1958 | Grosseau | 403/359 X |

OTHER PUBLICATIONS

An Introduction to Stainless Steel, *J. Gordon Parr*, Albert Hanson, copyright 1965, Note pp. 23 and 58–59.

*Primary Examiner*—Andrew V. Kundrat
*Attorney, Agent, or Firm*—Brisebois & Kruger

[57] ABSTRACT

The two parts of a splined coupling are held together axially by a resilient split locking ring. The locking ring is seated in grooves of the two parts, which are formed in the splines of the parts. The ring is formed from a stainless steel having a nitrided hardened surface layer to resist galling or damage to the ring as a result of the spline notched sides of the grooves.

6 Claims, 4 Drawing Figures

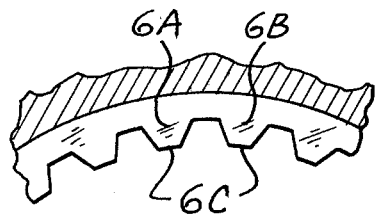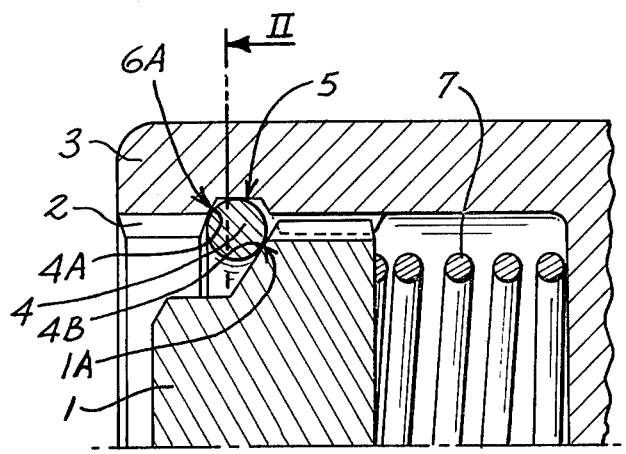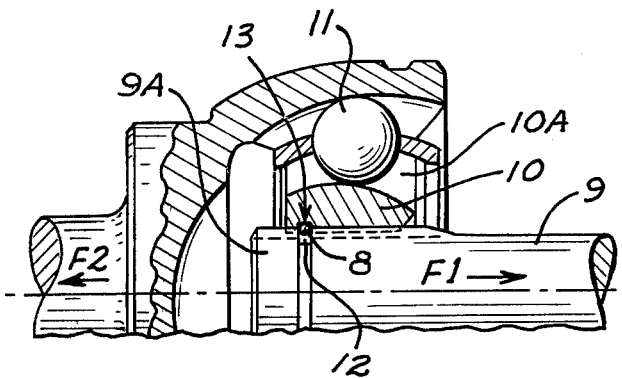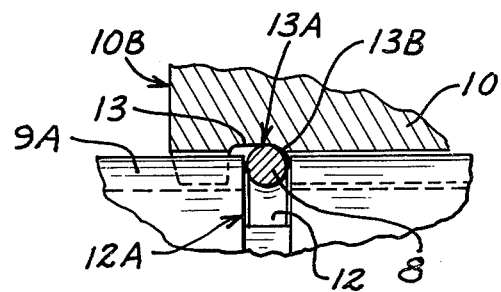

SPLIT RING RETENTION OF SPLINED OR TOOTHED PARTS

The present invention of Mr. Michel Francois Rigal relates to a toothed or splined coupling of two parts, such as a shaft and a female part, assembled by sliding and immobilized axially by a locking ring (split spring ring) partially lodged in a groove of at least one of the two parts.

BACKGROUND OF THE INVENTION

When ring grooves are made perpendicular to splines, the sides of the grooves are notched by the splines; as a result, the contact area with the side faces of the locking ring is discontinuous and of a reduced area, and eventual axial forces between the shaft and the female part cause contact pressures in this area which may be excessive and damage the locking ring, especially when one of the coupled parts is made of a very hard material, as is the case, for example, in universal transmission joints in which a body forming the race or track for rolling elements constitutes a female part integral with a shaft or axle.

Damage to the side faces of the locking ring is a significant disadvantage in the case of couplings in which one of the grooves has a flank which is inclined or beveled to exert a radial thrust on the locking ring when opposed axial forces are applied respectively to the shaft and the female part, this radial thrust being sufficient, for large enough axial forces, to elastically deform the locking ring enough to extract it from the groove with the inclined flank, thus allowing axial disconnection of the shaft and the female part. The sliding of the locking ring on the notched inclined flank of the groove may be impeded, during dissassembly if its side faces are superficially slightly indented, for example, with ridges due to contact with machining marks of the sides of the groove.

The object of the present invention is to eliminate the above disadvantages by making the locking ring of a material to give it not only the elasticity required for its introduction by deformation into the groove, but also sufficient hardness to keep its side faces from being damaged by the notched sides of the groove.

The locking rings are usually made of a so-called spring steel, that is, with a reasonably high carbon content—of about 0.6 to 0.7%—, with satisfactory spring characteristics, but its insufficient hardness cannot be increased, by thermal hardening treatment followed by drawing, without reducing its toughness or resilience, that is, without increasing its brittleness.

Mild steels—with a carbon content of about 0.1%—on the other hand have good ductility allowing parts such as the locking rings to be easily formed, and maintain sufficient resilience after surface layer hardening by case hardening consisting of increasing the carbon content in a thin surface layer and then subjecting it to thermal hardening. Such hardening along the entire surface of the locking ring gives it the required elasticity, but the surface hardness (about 800 vickers) is not enough to resist high contact pressures from adjacent parts made of very hard steel. Moreover, the hardening following the case hardening is done at very high temperatures—about 850° C.—requiring a large expenditure of heat energy and perhaps causing unacceptable distortion or deformation of the parts treated.

SUMMARY OF THE INVENTION

On the other hand, nitriding treatment is done at lower temperatures—about 550° C.—and gives a greater hardening of the surface (about 900 to 1000 vickers); this nitriding being easier to carry out and more effective on a steel alloyed with nickel and/or chrome, and the invention has as an object the application of such a treatment to locking rings made of stainless steel with low carbon content, of the austenitic type which are both ductile and have high mechanical strength, and have high nickel and/or chrome content.

The invention consists of a splined or toothed coupling of two parts retained axially by a locking ring set partially in a groove of at least one of the two parts, the sides of the groove being notched by the splines, and is characterized by the fact that the locking ring is made of austenitic stainless steel with low carbon content and high nickel and/or chrome content, which is surface hardened by nitriding.

The description which follows relates to two examples of applications particularly useful for the present invention.

BRIEF DESCRIPTION OF THE DRAWINGS

FIG. 1 shows a partial view in section of the coupling of a circular part in a cylindrical part which could be a rotary device of a variable velocity drive;

FIG. 2 is a partial view in section along II of the cylindrical part of FIG. 1;

FIG. 3 shows an axial section of a transmission joint with a locking ring retaining a shaft axially, for rapid disassembling; and FIG. 4 is an enlarged view of the region of the locking ring of FIG. 3.

The example in FIG. 1 relates to the device described in French Pat. No. 2,296,118. Circular part 1 is connected or coupled by splines 2 to a cylindrical part 3; their axial immobilization is ensured by a locking ring 4 (split ring) sufficiently elastic to be introduced in groove 5, by deformation, during assembly by sliding of the two parts.

Groove 5 is machined perpendicular to the splines, its sides are notched or serrated by the splines, so that the area of contact with the locking ring is limited to circular segment portions such as 6A, 6B visible on FIG. 2. When significant axial forces, schematized by spring 7, are applied between parts 1 and 2—and especially when these forces are unequally and variably distributed, particularly because of their eccentricity and subjected to a mutational movement in the case of a variable drive such as that described in the above patent—the contact pressures in areas 6A, 6B may cause progressive deterioration of the locking ring by damaging its side face 4A. The same is true for the other side face 4B in axial thrust contact with tapering end face 1A of the grooved portion of circular part 1.

The transmission joint shown on FIG. 3 has a spring locking ring 8 axially immobilizing on a splined shaft 9 an element 10 having tracks 10A which cooperate with bearing balls 11. The locking ring is set partially in groove 12 of the shaft and partially in an annular seat 13 of element 10. Groove 12 is deep enough to entirely contain the locking ring when compressed during assembling by sliding element 10 over shaft 9. The depth of seat 13 is such that locking ring 8 can rest radially by its periphery against the bottom 13A of the seat while its side faces cooperate with the sides of the groove and the seat. Seat 13 has at least one side 13B placed on the opposite side of locking ring 8 from end 9A of the shaft.

FIG. 4 shows an embodiment in which seat 13 is in the form of a groove, but as a variation it could have only flank 13B and bottom 13A and open directly on the side 10B of part 10 turned toward the end 9A of the shaft, the flank 13B then constituting the end of the toothed portion of part 10.

In these two cases, at least side 13B is so inclined as to allow rapid disassembly of the locking ring by application of opposed axial forces, respectively F1, on the shaft and F2 on element 10, sufficiently large so that the radial inward thrust which acts on the locking ring due to the inclination of flank 13B tends to elastically deform the locking ring so as to squeeze it out of seat 13 and introduce it entirely in groove 12, thus permitting relative sliding of shaft 9 and element 10. Groove 12 and seat 13 being formed perpendicular to the splines, their sides are notched, thus reducing the area of contact between the sides of the groove and the side faces of the locking ring, as indicated above (see FIG. 2), and the area of contact further decreases when contact is closer to radial edge 6C of the side of the groove. The radially inward or centripetal sliding of the locking ring between two opposite sides, respectively 12A of shaft 9 and 13B of element 10, is accomplished against friction forces which become greater as the condition of the surface of the locking ring and the sides of the grooves become poorer, and smaller when the parts are harder. Element 10 being made, to be compatible with the rolling of ball bearings 11, of a very hard material such as tempered or casehardened steel, the notched contour of the sides of seat 13 and the possible tool grooves due to their machining may imprint themselves on the side faces of the locking ring and consequently excessively increase the friction forces.

In the two examples described above, to avoid harmful damage to the locking ring, the latter is made, according to the invention, so as to have a surface layer hardness greater than that of hardened or cementation steel while being sufficiently ductile to be easily shaped, sufficiently elastic to be installed and disassembled without permanent deformation, and sufficently tough not to rupture due to possible shocks. For this purpose, the locking ring is made of austenitic stainless steel containing about 0.06% carbon, alloyed with significant amounts of chrome and/or nickel: in particular commercial stainless steels may be used such as those now called 18×8 and 18×10 (18×8 contains about 18% chrome and about 8% nickel, and 18×10 contains about 18% chrome and about 10% nickel); their low carbon content provides the desired ductility, the austenitic composition corresponds to the best mechanical strength for the steel chosen, and the presence of nickel and/or chrome favors the surface hardening treatment then carried out on the locking ring and consisting of a nitriding for several hours in an ionized bath or a hot gaseous environment: this treatment gives the steel a Vickers surface layer hardness of more than 900, ensuring that the locking ring has the required hardness with respect to the high contact pressures which it undergoes and so maintains a good surface condition; the thin layer of high mechanical resistance thus superficially formed also gives the locking ring the desired elasticity, while the toughness of the ring is ensured by its core composition of a steel with low carbon content and which is not able to be hardened.

Correspondingly, a preferred austenitic stainless steel has a carbon content of about 0.06%, nickel in the range of about 8% to 10%, and a chrome content of about 18%.

What is claimed is:

1. A splined coupling of two parts immobilized axially by a resilient split locking ring set partially in a groove of at least one of the two parts, the sides of the groove being notched by the splines, characterized by the fact that the locking ring comprises a steel with a low carbon content, of the austenitic type, with a high nickel and/or chrome content, and having a nitrided hardened surface layer.

2. A coupling according to claim 1 characterized by the fact that the locking ring is made of a steel whose carbon, nickel and chrome contents are respectively about 0.06%, 8 to 10% and 18%.

3. A coupling according to claims 1 and 2 wherein the coupling comprises a circular part in a cylindrical part and axially immobilized by said split locking ring, said ring extending at least partly into a groove of the cylindrical part whose sides are notched by the splines and being in thrust contact with a tapering face of the circular part.

4. A splined coupling according to claims 1 or 2 comprising a groove in one of the parts deep enough to contain the whole locking ring, during sliding assembly of the two parts, and an annular seat in the other part having at least one side inclined to impart to the locking ring a radial thrust sufficient to force the ring out of the seat when sufficient opposite axial forces are applied respectively to the two parts, the sides of the groove and the seat being notched by said splines.

5. A method of connecting together a splined coupling having two parts to be immobilized by a resilient split locking ring set at least partially in a groove formed in at least one of the parts and the sides of which are notched by splines, the method comprising, setting in said groove a locking ring of an austenitic steel of low carbon content and a high nickel and/or chrome content and having a nitrided hardened surface layer, said hardened surface layer resisting damage and imprinting by the notched groove and imparting increased resiliency to said ring, while the unhardened steel inwardly of the hardened surface layer provides a tough ductile core and avoids breakage from shock and impact.

6. A method according to claim 5 wherein the carbon content, nickel content, and chrome content of the ring set in the groove are respectively about 0.06%, 8 to 10%, and 18%, and the nitrided hardened surface layer is of a VICKERS surface hardness greater than 900.

* * * * *